(No Model.)
W. C. HOMAN.
CYCLOMETER.
No. 594,875. Patented Dec. 7, 1897.
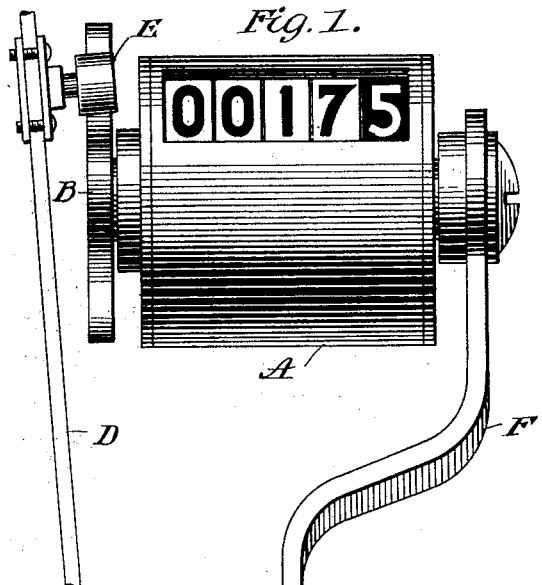
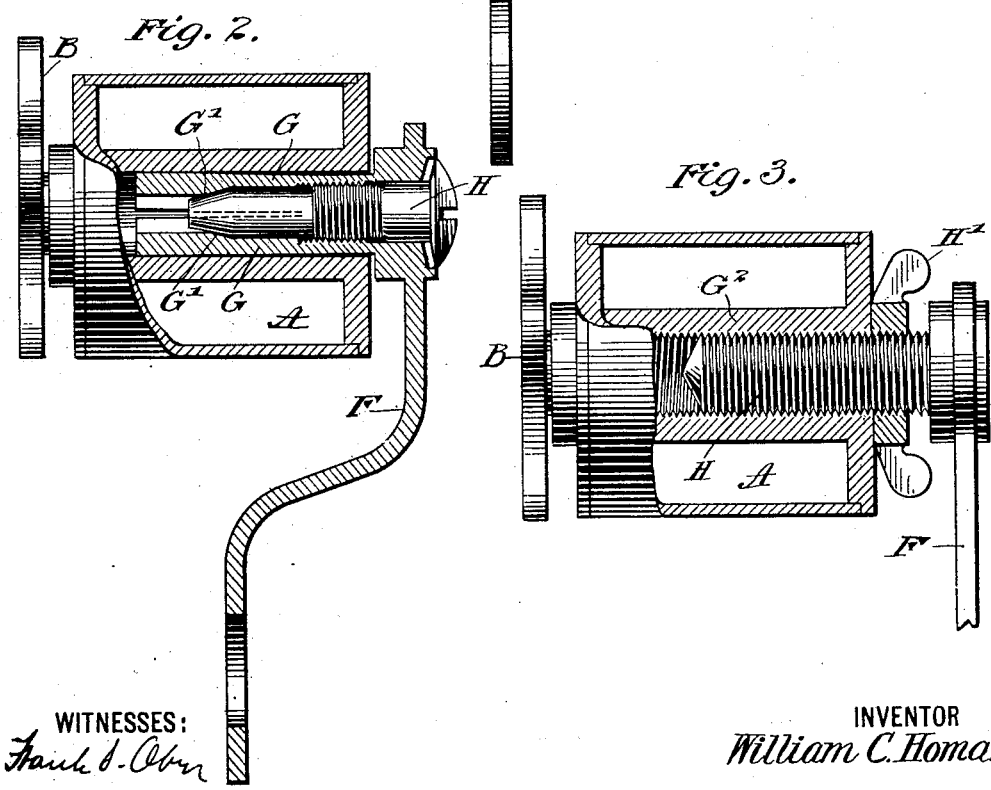
WITNESSES:
Frank J. Obey
Lillie Vreeland
INVENTOR
William C. Homan.
BY
R. Cutchell
ATTORNEY

UNITED STATES PATENT OFFICE.

WILLIAM C. HOMAN, OF MERIDEN, CONNECTICUT, ASSIGNOR TO THE EDWARD MILLER & COMPANY, OF SAME PLACE.

CYCLOMETER.

SPECIFICATION forming part of Letters Patent No. 594,875, dated December 7, 1897.

Application filed May 14, 1897. Serial No. 636,463. (No model.)

*To all whom it may concern:*

Be it known that I, WILLIAM C. HOMAN, a citizen of the United States, residing at Meriden, in the county of New Haven and State of Connecticut, have invented certain new and useful Improvements in Cyclometers, of which the following is a full, clear, and exact specification.

My invention relates to improvements in cyclometers for bicycles and other vehicles, and particularly to that class of cyclometers known as "barrel" cyclometers, in which the body of the cyclometer is substantially cylindrical and the registering-numerals appear through an opening or window in the side thereof.

My invention consists in providing a means in combination with a cyclometer whereby the latter may be readily adjusted as to its position.

The object of my invention is to provide a simple, inexpensive, compact, and effective means whereby the position of the cyclometer may be readily adjusted, so as to make the registering-numerals clearly visible to the eye of the rider, which means also permits the ready and accurate adjustment of the cyclometer with respect to the striker ordinarily carried by the wheel of the vehicle, by which means the said cyclometer is driven.

My invention is illustrated by the accompanying drawings, in which—

Figure 1 is a view of the cyclometer and adjusting means as it appears to the eye of the rider. Fig. 2 is a section through the parts shown in Fig. 1, and Fig. 3 illustrates a modification.

A is a cyclometer-casing, through a window in the side of which registering-numerals carried by a suitable train of parts are visible, as shown in Fig. 1.

B is a star-wheel operatively connected to the internal numeral-bearing parts.

D represents one of the spokes of a bicycle-wheel, and E is a striker carried by said spoke, said striker being adapted to impinge at each revolution of the wheel against one of the teeth of the star-wheel B, giving to the same a partial rotation, and thereby imparting motion to the registering mechanism.

Cyclometers are ordinarily attached at a point closely adjacent to the wheel of the vehicle, and it is important that suitable means be provided whereby the position of the cyclometer may be accurately adjusted, so as to bring the star-wheel commonly used into the path of travel of the strike and also so that the numeral-bearing devices may be set in a position to be clearly visible to the rider. To accomplish these ends, I provide a suitably-formed bracket or fixture F, one end of which is adapted to be secured to the frame of the vehicle at any convenient place and in any desirable manner. Ordinarily the free end of this fixture is perforated and adapted to be slipped over that portion of the front-wheel axle which projects outside the front-fork tube, in which position it may be secured by a nut. At the opposite end of the fixture F is provided an inwardly-projecting stem G. In the preferred construction illustrated in Figs. 1 and 2 the stem G is tubular, the inner free extremity being split. G' G' are shoulders formed on the inner surface of the tube adjacent said split extremity.

H is a screw having a suitable head or means at one end to permit its being turned, the opposite end being by preference beveled or tapered, as clearly shown in Fig. 2. The tubular stem G is internally threaded for part of its length to receive the screw H.

The casing A of the cyclometer is provided with a suitable opening or recess in the end thereof to receive the stem G. This opening or recess is preferably in line with and concentric with the axis of said casing, although it may be eccentric, if desirable.

In operation the casing A is slipped onto the stem G, the screw H being withdrawn sufficiently to permit the split end of the said stem to contract sufficiently. When the position of the casing has been so adjusted as to bring the star-wheel B into the path of travel of the striker E and to bring the window through which the registering-numerals are visible into the line of vision of the rider, the parts may be securely fastened by turning the screw H in, the said inward movement of the screw spreading the split ends of the stem G and causing them to tightly contact with the surrounding wall of the casing.

In the modification shown in Fig. 3, $G^2$ is an externally-threaded stem adapted to enter a correspondingly-threaded opening in the cyclometer. H' is a nut on said screw-threaded stem, said nut comprising the locking means. To adjust the parts shown in Fig. 3, the nut H' is loosened, so that by revolving the casing A' in one direction or the other the star-wheel may be moved close to or farther away from the wheel of the vehicle.

In carrying out my invention certain changes in construction may be desirable, and I therefore do not limit myself to the specific form and arrangement of parts herein shown, but hold myself at liberty to make such changes as are fairly within the spirit and scope of my invention. For instance, any well-known means for spreading the split ends of the stem G may be substituted in place of the means herein shown and described.

What I claim is—

1. The combination of a cyclometer-casing having a stem-receiving opening therein, with a fixture carrying a laterally-directed tubular supporting-stem, adapted to enter said opening, the free end of said stem being split, and locking means carried within said stem, whereby the inner end of the stem may be expanded to secure the casing in the desired position.

2. The combination of a cylindrical cyclometer-casing having an internal stem-receiving recess therein concentric with its axis, with a fixture carrying a laterally-directed tubular stem, adapted to enter said opening, the free end of said stem being split and provided with internal shoulders, the opposite end being internally threaded, a screw for entering said threaded end of the stem, the free end of said screw being beveled or tapered, and adapted to coact with the shouldered split inner ends of said stem to expand the inner end of the same and lock said parts in the desired position.

WILLIAM C. HOMAN.

Witnesses:
W. L. BABCOCK,
CHAS. E. HOMAN.